United States Patent
Choi

(10) Patent No.: US 10,403,433 B2
(45) Date of Patent: Sep. 3, 2019

(54) MULTILAYER ELECTRONIC COMPONENT

(71) Applicant: SAMSUNG ELECTRO-MECHANICS CO., LTD., Suwon-si, Gyeonggi-do (KR)

(72) Inventor: Woo Jin Choi, Suwon-si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/633,236

(22) Filed: Jun. 26, 2017

(65) Prior Publication Data
US 2018/0122578 A1    May 3, 2018

(30) Foreign Application Priority Data
Nov. 1, 2016    (KR) .................. 10-2016-0144715

(51) Int. Cl.
| | |
|---|---|
| *H01G 2/06* | (2006.01) |
| *H01G 4/228* | (2006.01) |
| *H01G 4/38* | (2006.01) |
| *H01G 4/232* | (2006.01) |
| *H01G 4/12* | (2006.01) |
| *H01G 4/30* | (2006.01) |

(52) U.S. Cl.
CPC ............... *H01G 2/06* (2013.01); *H01G 4/232* (2013.01); *H01G 4/38* (2013.01); *H01G 4/12* (2013.01); *H01G 4/30* (2013.01); *H01G 4/304* (2013.01)

(58) Field of Classification Search
CPC ............. H01G 4/248; H01G 4/38; H01G 4/30

USPC ................................................... 361/328–330
See application file for complete search history.

(56) References Cited

U.S. PATENT DOCUMENTS

| | | | | |
|---|---|---|---|---|
| 6,046,902 | A  * | 4/2000 | Nakagawa .............. | H01G 4/228 361/306.1 |
| 6,191,933 | B1 * | 2/2001 | Ishigaki .................. | H01G 4/232 361/309 |
| 6,373,714 | B1 * | 4/2002 | Kudoh .................... | H05K 1/141 361/735 |
| 2011/0043963 | A1 * | 2/2011 | Bultitude ................. | H01G 2/16 361/321.4 |

(Continued)

FOREIGN PATENT DOCUMENTS

| | | |
|---|---|---|
| JP | 11-040460 A | 2/1999 |
| JP | 2000-306764 A | 11/2000 |
| JP | 3687832 B2 | 8/2005 |

*Primary Examiner* — Eric W Thomas
(74) *Attorney, Agent, or Firm* — Morgan, Lewis & Bockius LLP

(57) ABSTRACT

A multilayer electronic component includes a first capacitor including a first multilayer body having a structure in which a plurality of internal electrodes and a plurality of dielectric layers are alternately stacked, a second capacitor including a second multilayer body disposed adjacent the first multilayer body, the second multilayer body connected to the first multilayer body in parallel, and the second multilayer body having a structure in which a plurality of internal electrodes and a plurality of dielectric layers are alternately stacked, a fixing member fixing the first and second multilayer bodies, a first lead terminal connected to a first end portion of the fixing member, and a second lead terminal connected to a second end portion of the fixing member.

20 Claims, 6 Drawing Sheets

(56) References Cited

U.S. PATENT DOCUMENTS

| | | | |
|---|---|---|---|
| 2013/0194715 A1* | 8/2013 | Kim | H01G 4/1218 |
| | | | 361/301.4 |
| 2016/0205769 A1* | 7/2016 | Park | H01G 4/224 |
| | | | 174/260 |
| 2016/0219739 A1* | 7/2016 | Park | H01G 4/30 |
| 2017/0103852 A1* | 4/2017 | Ando | H01G 4/002 |

* cited by examiner

MULTILAYER ELECTRONIC COMPONENT

CROSS-REFERENCE TO RELATED APPLICATION(S)

This application claims the benefit of priority to Korean Patent Application No. 10-2016-0144715, filed on Nov. 1, 2016 with the Korean Intellectual Property Office, the disclosure of which is incorporated herein by reference in its entirety.

TECHNICAL FIELD

The present disclosure relates to a multilayer electronic component and, more particularly, to a multilayer ceramic capacitor with reduced acoustic noise.

BACKGROUND

Recently, multiple multilayer ceramic capacitors having advantages such as compactness, guaranteed high capacitance, and ease in the mounting thereof are being used in various electronic devices.

Multilayer ceramic capacitors are mounted on boards of various electronic products, such as computers, personal digital assistants (PDAs), or mobile phones in order to charge or discharge electricity.

A multilayer ceramic capacitor (MLCC) may include a plurality of dielectric layers and internal electrodes having a structure in which the internal electrodes, having opposite polarities, are disposed alternately between the dielectric layers.

The dielectric layers may have piezoelectric and electrostrictive properties. Thus, when a direct current (DC) or alternating current (AC) voltage is applied to the MLCC, a piezoelectric phenomenon may occur between the internal electrodes, causing vibrations.

Vibrations may be transferred to a board on which the MLCC is mounted, through external electrodes of the MLCC, making the entirety of the board act as an acoustically reflective surface, which generates vibratory sound as noise.

The vibratory sound may correspond to audio frequencies ranging from 20 Hz to 20,000 Hz, causing discomfort for listeners, and such a vibratory sound, which may cause discomfort for listeners, is commonly known as acoustic noise.

In order to reduce such noise, in Japanese Patent Laid-Open Publication No. 2000-306764, a lead terminal is bonded to external electrodes, to suppress transmission of mechanical vibrations generated in a condenser to a board. However, a limitation remains in preventing a transmission of noise to the board through the lead terminal.

SUMMARY

An aspect of the present disclosure may provide a multilayer electronic component with reduced acoustic noise.

According to an aspect of the present disclosure, a multilayer electronic component may include: a first capacitor including a first multilayer body having a multilayer structure in which a plurality of internal electrodes and a plurality of dielectric layers are alternately stacked; a second capacitor including a second multilayer body, disposed above the first multilayer body, connected to the first multilayer body in parallel, and having a structure in which a plurality of internal electrodes and a plurality of dielectric layers are alternately stacked; a fixing member fixing the first and second multilayer bodies to each other; a first lead terminal connected to a first end portion of the fixing member; and a second lead terminal connected to a second end portion of the fixing member, facing the first end portion.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Exemplary embodiments of the present disclosure will now be described in detail with reference to the accompanying drawings.

Hereinafter, a multilayer electronic component according to exemplary embodiments of the present disclosure will be described, but the present disclosure is not limited thereto.

Multilayer Electronic Component

Figure 1:
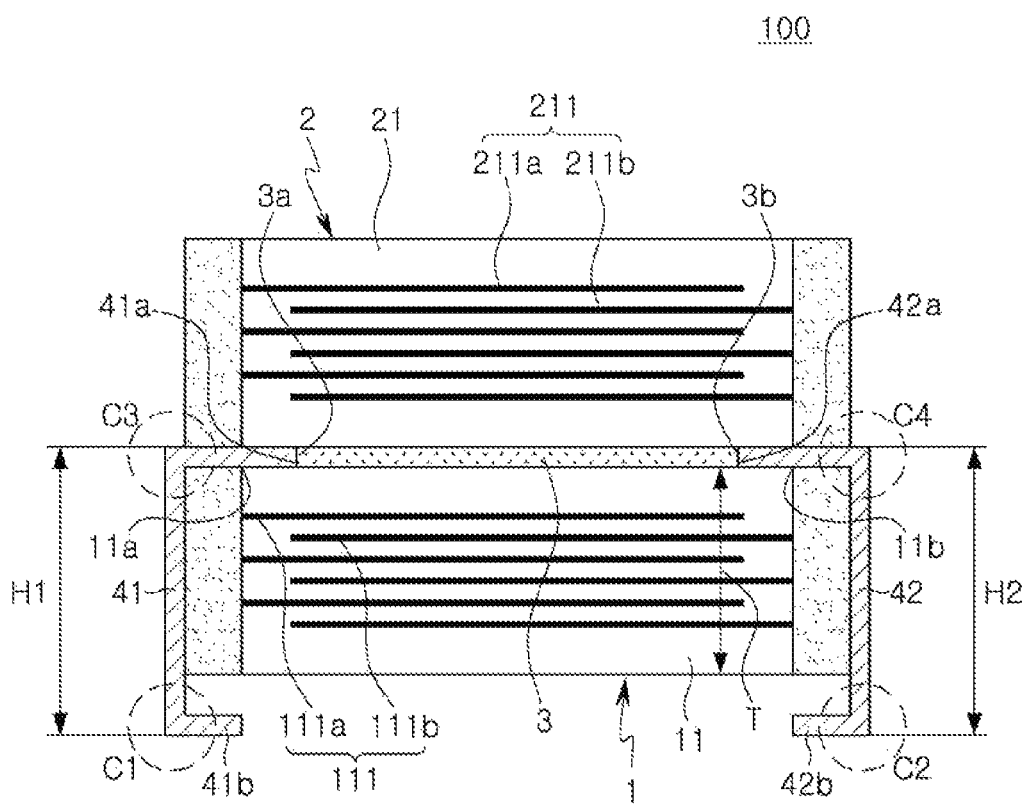
FIG. 1 is a cross-sectional view of a multilayer electronic component according to exemplary embodiments of the present disclosure.

FIG. 1 is a cross-sectional view of a multilayer electronic component according exemplary embodiments of the present disclosure. Referring to FIG. 1, a multilayer electronic component 100 according to exemplary embodiments of the present disclosure includes a first capacitor 1, a second capacitor 2 disposed above the first capacitor 1, a fixing member 3 fixing, or connecting, the first and second capacitors land 2, and a first lead terminal 41 and a second lead terminal 42 connected to opposite end portions of the fixing member 3 and disposed on an external surface of the first capacitor 1.

The first and second capacitors 1 and 2 include first and second multilayer bodies 1 and 2, respectively. The first and second multilayer bodies 1 and 2 have a multilayer structure in which a plurality of internal electrodes 111 and 211 and dielectric layers are alternately stacked. The dielectric layers are formed by sintering a ceramic green sheet including dielectric ceramics such as, for example, $BaTiO_3$-based-, $Ba(Ti, Zr)O_3$-based or $(Ba, Ca)TiO_3$-based ceramics and within the multilayer body, the dielectric layers are integrated such that boundaries therebetween may not be readily apparent. The internal electrodes 111 within the first multilayer body 11 include first and second internal electrodes 111a and 111b having opposite polarities, and the internal electrodes 211 within the second multilayer body 21 include first and second internal electrodes 211a and 211b having opposite polarities. The first and second internal electrodes 111a, 111b, 211a, and 211b are formed by printing conductive paste including nickel (Ni), for example, on a ceramic green sheet to form a pattern, and sintering the pattern having the ceramic green sheet. The first and second internal electrodes 111a, 111b, 211a, and 211b are alternately disposed in a stacked direction, and here, a region in which the first internal electrodes and the second internal electrodes overlap each other, is a portion substantially forming capacitance within the multilayer body.

The first and second capacitors 1 and 2 are disposed sequentially in a thickness direction, and the first multilayer body 11 of the first capacitor 1 is disposed below the second multilayer body 21 of the second capacitor 2, and thus the first and second multilayer bodies 11 and 21 are disposed to be parallel to each other.

First and second external electrodes are disposed on external surfaces of first and second surfaces of the first multilayer body 11, facing each other in a length direction, and the first and second lead terminals as described hereinafter may be disposed on at least partial regions of the first and second external electrodes. Third and fourth external electrodes are disposed on external surfaces of third and fourth surfaces of the second multilayer body 21 facing each other in the length direction, while first and second lead terminals are not disposed on surfaces of the third and fourth external electrodes.

The first multilayer body 11 and the second multilayer body 21 are fixed by the fixing member 3, and the fixing member 3 will now be described.

The fixing member 3 may be any member, as long as the fixing member can fix the first and second multilayer bodies 11 and 21. For example, the fixing member 3 may be a board or an adhesive. When the fixing member 3 is a board, the board may be a PCB or a flexible printed circuit board (FPCB), for example. A thickness of the board may be 5 μm to 20 μm, for example, which is a thickness of a generally utilized PCB or FPCB. When the fixing member is an adhesive, the adhesive may be an epoxy resin. In addition, the adhesive may be a ceramic, silicon, or acrylic adhesive. The adhesive may have a predetermined shape when placed between the first and second multilayer bodies 11 and 21, to fix the first and second multilayer bodies 11 and 21.

The fixing member 3 may be positioned at the center of vibrations generated in the two multilayer bodies, i.e., the first and second multilayer bodies 11 and 21, to cancel out vibrations generated in each of the multilayer bodies. In addition, since vibration noise generated in two multilayer bodies having a relatively small size is smaller than that of a single large multilayer body, final noise may be effectively reduced as noise is canceled out, absorbed and/or dissipated through the fixing member. Also, since the fixing member is connected to the first and second lead terminals (to be described hereinafter) and eventually connected to a PCB, noise transferred to the PCB from the inside of the multilayer bodies may pass out through an intermediate material of the lead terminals, reducing the strength of the noise.

The fixating member 3 includes first and second end portions 3a and 3b facing each other in the length direction of the first and second multilayer bodies 11 and 21. The first end portion 3a is connected to the first lead terminal 41, and the second end portion 3b is connected to the second lead terminal 42. Hereinafter, the first and second lead terminals 41 and 42 will be described in detail.

Since the first and second lead terminals 41 and 42 are configured to electrically connect a multilayer electronic component and an external board through soldering, the first and second lead terminals 41 and 42 may be formed of a material having electrical conductivity. For example, the first and second lead terminals 41 and 42 may be formed of nickel (Ni), copper (Cu), palladium (Pd), or an alloy thereof. The first and second lead terminals 41 and 42 may be metal frames.

First, the first lead terminal 41, connected to the first end portion 3a of the fixing member 3, includes a first end portion 41a, connected to the first end portion 3a, and a second end portion 41b extending from the first end portion 41a. Referring to FIG. 1, the first lead terminal 41 includes at least one bent portion C1, and the second end portion 41b may extend in a direction parallel to a lower surface of the first multilayer body 11 due to the bent portion C1.

Next, the second lead terminal 42, connected to the second end portion 3b of the fixing member 3, includes a first end portion 42a, connected to the second end portion 3b and a second end portion 42b extending from the first end portion 42a. Referring to FIG. 1, the second lead terminal 42 includes at least one bent portion C2, and the second end portion 42b may extend in a direction parallel to the lower surface of the first multilayer body 11 due to the bent portion C2.

A height H1 between the first end portion 41a and the second end portion 41b of the first lead terminal 41 is greater than a distance from an upper surface of the first multilayer body 11 to the lower surface thereof, i.e., a height T of the first multilayer body 11 and, similarly, a height H2 between the first end portion 42a and the second end portion 42b of the second lead terminal 42, is greater than a distance from the upper surface of the first multilayer body 11 to the lower surface thereof, i.e., the height T of the first multilayer body 11. This means that at least a portion of the first lead terminal 41, from the bent portion C1 of the first lead terminal 41 to the second end portion 41b of the first lead terminal 41, is disposed to be spaced apart from the lower surface of the first multilayer body 11, rather than overlapping the lower surface of the first multilayer body 11, and at least a portion of the second lead terminal 42, from the bent portion C2 of the second lead terminal 42 to the second end portion 42b of the second lead terminal 42, is disposed to be spaced apart from the lower surface of the first multilayer body 11, rather than overlapping the lower surface of the first multilayer body 11.

As a result, when the multilayer electronic component including the first and second capacitors 1 and 2 is mounted on a board, the lower surface of the first multilayer body 11 is disposed to be spaced apart from the board by a predetermined distance in a height direction, preventing vibrations generated in the multilayer electronic component from being transferred to the board, to thus additionally reduce acoustic noise generated when a voltage is applied to the multilayer electronic component.

Since the first and second lead terminals 41 and 42 include the bent portions C1 and C2, respectively, the second end portion 41b of the first lead terminal 41 and the second end portion 42b of the second lead terminal 42 may face each other.

Referring to FIG. 1, the first end portion 3a and the second end portion 3b of the fixing member 3 may be disposed on an inner side of a first edge 11a of an upper surface of the first multilayer body 11 and on an inner side of a second edge 11b facing the first edge 11a in a length direction, respectively. Here, the first and second lead terminals 41 and 42, connected to the first and second end portions 3a and 3b of the fixing member 3, respectively, may further include bent portions C3 and C4 formed above an upper surface of the first multilayer body 11, respectively, in addition to the bent portions C1 and C2 formed below a lower surface of the first multilayer body 11, and the first and second lead terminals 41 and 42, disposed on an inner side of the edges of the upper surface of the first multilayer body 11, may be disposed on external surfaces of external electrodes of the first capacitor 1.

A point where the first end portion 3a of the fixing member 3 and the first end portion 41a of the first lead terminal 41 are connected to each other is further inward, in the length direction of the first capacitor 1, than a point at the start of the first external electrode. A point where the second end portion 3b of the fixing member 3 and the first end portion 42a of the second lead terminal 42 are connected to each other is further inward, in the length direction of the first capacitor 1, than a point where the second external electrode starts, but a degree of extending inwardly is not limited, as long as the first and second multilayer bodies 11 and 21 are reliably fixed by the fixing member 3.

Figure 2:
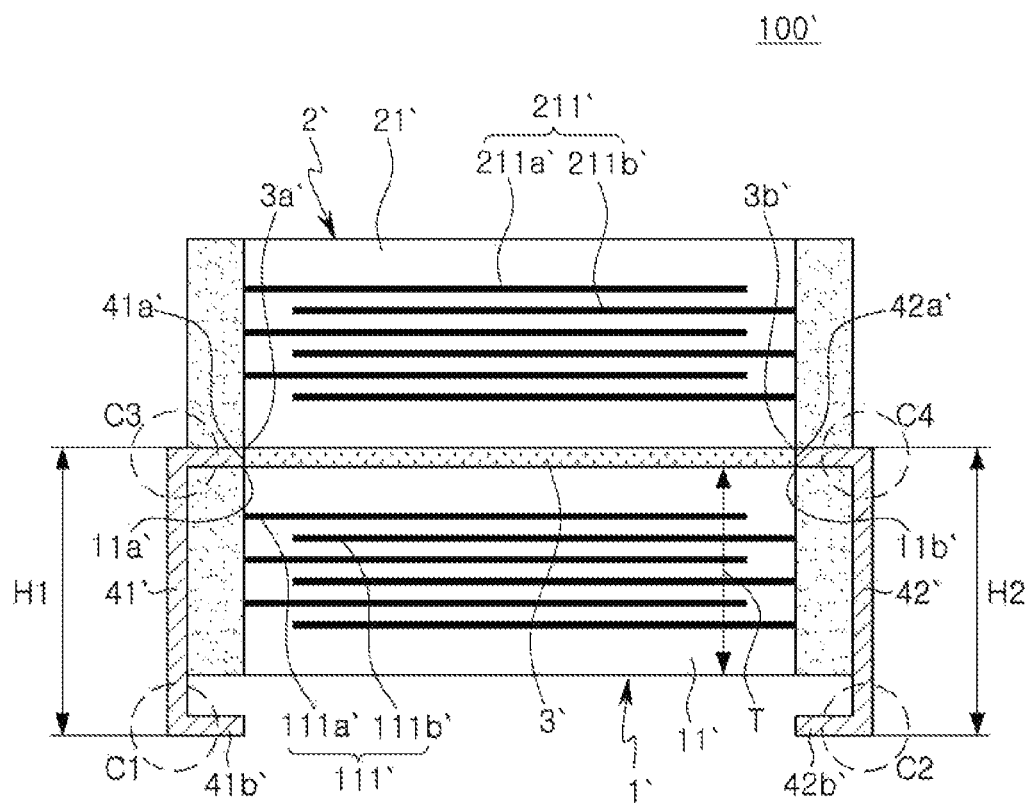
FIG. 2 is a cross-sectional view of a multilayer electronic component according to exemplary embodiments of the present disclosure.

FIG. 2 is a cross-sectional view of a multilayer electronic component according to a modified example of the multilayer electronic component of FIG. 1. Compared with the multilayer electronic component of FIG. 1, in the multilayer electronic component of FIG. 2, a length of a fixing member extending in a length direction of a first multilayer body 11' is a primary difference. Thus, repeated descriptions of the same elements of FIG. 1 will be omitted, hereinafter.

Referring to FIG. 2, a fixing member 3' extends from a first edge of an upper surface of the first multilayer body 11' to a second edge facing the first edge in a length direction. Thus, a point where a first end portion 3a' of the fixing member 3' is connected to a first end portion 41a' of a first lead terminal 41' is at a point where a first external electrode starts, in a length direction of a first capacitor 1'. A point where a second end portion 3b' of the fixing member 3' is connected to a first end portion 42a' of a second lead terminal 42' is at a point where a second external electrode starts, in the length direction of the first capacitor 1'.

Figure 3:
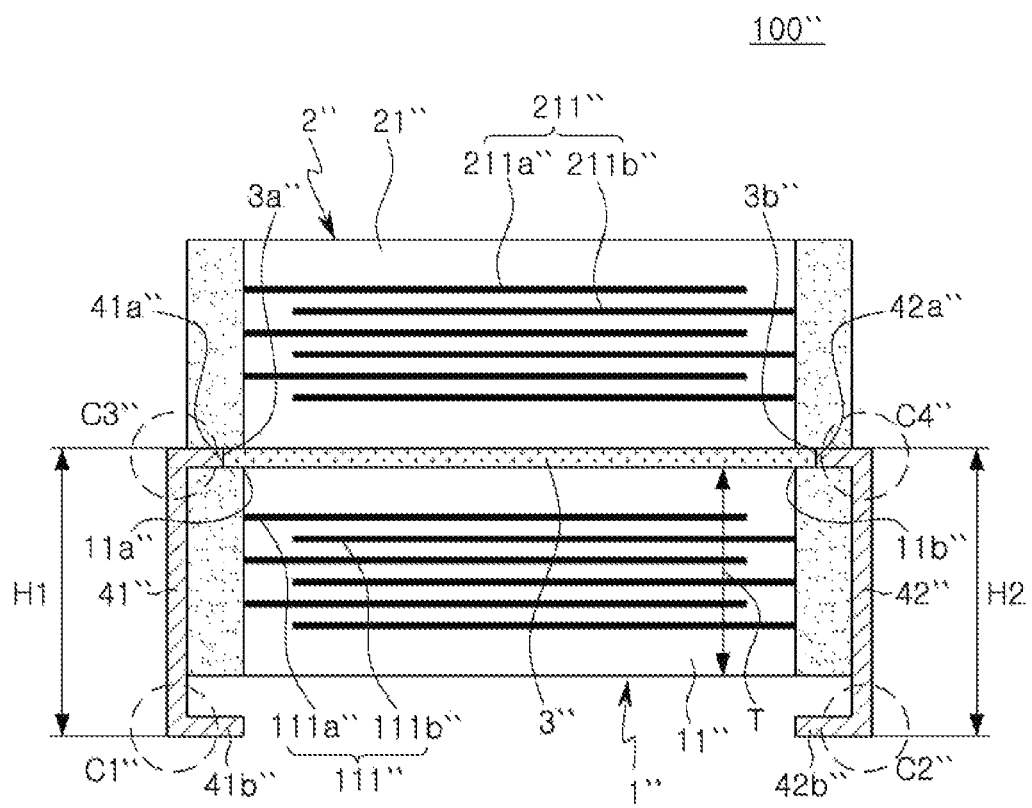
FIG. 3 is a cross-sectional view of a multilayer electronic component according to exemplary embodiments of the present disclosure.

FIG. 3 is a cross-sectional view of a multilayer electronic component according to a modified example of the multilayer electronic components of FIG. 1. Compared with the multilayer electronic components of FIGS. 1 and 2, in the multilayer electronic component of FIG. 3, a length of a fixing member 3" extending in a length direction of a first multilayer body 11" is a primary difference. Thus, repeated descriptions of the same elements as those of FIG. 1 will be omitted, hereinafter.

Referring to FIG. 3, a first end portion 3a" and a second end portion 3b" of the fixing member 3" extend to an outer side of a first edge of an upper surface of the first multilayer body 11" and to an outer side of a second edge of the upper surface of the first multilayer body 11" facing the first edge in a length direction, respectively. The opposing end portions 3a" and 3b" of the fixing member 3" are disposed below third and fourth external electrodes of a second capacitor 2" and above first and second external electrodes of a first capacitor 1". Like the multilayer electronic components of FIGS. 1 and 2, first and second lead terminals 41" and 42" include at least two bent portions C1", C2", C3", and C4", and are disposed on external surfaces of the first and second external electrodes of the first capacitor, respectively. The first lead terminal 41" may include a second end portion 41b", the second lead terminal 42" may include a second end portion 42b", and the second end portion 41b" and the second end portion 42b" may face each other.

Figure 4A:
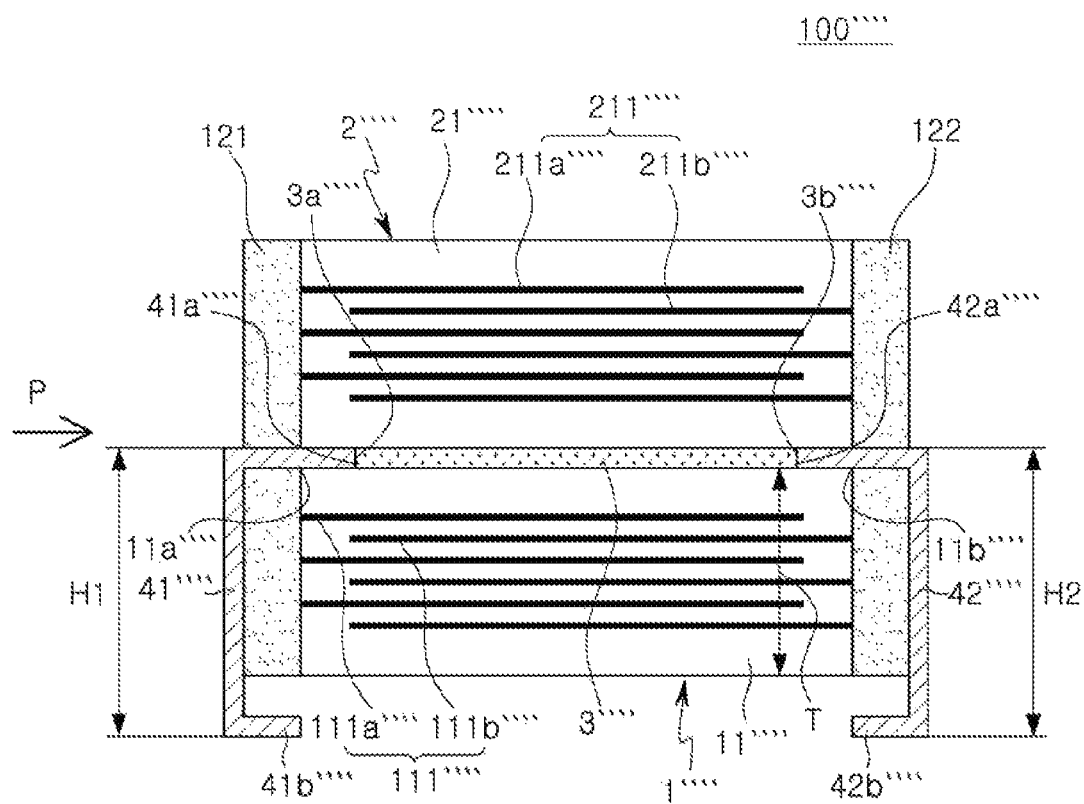
FIG. 4A is a cross-sectional view of a multilayer electronic component according to a modified embodiment of the multilayer electronic component of FIG. 1.

FIG. 4A is a cross-sectional view of a multilayer electronic component according to an example in which the structure of an external electrode of the multilayer electronic component of FIG. 1 is modified. Referring to FIG. 4A, first and second capacitors include first and second common external electrodes 121 and 122, common to first and second multilayer bodies within the first and second capacitors, rather than individually including first and second external electrodes and third and fourth external electrodes, respectively.

Since FIG. 4A is a cross-sectional view, it can be seen that the multilayer electronic component has substantially the same structure as that of the multilayer electronic component of FIG. 1. However, referring to FIG. 4B, a difference in configuration between the multilayer electronic component of FIG. 4A and the multilayer electronic component of FIG. 1 may be clearly recognized.

Figure 4B:
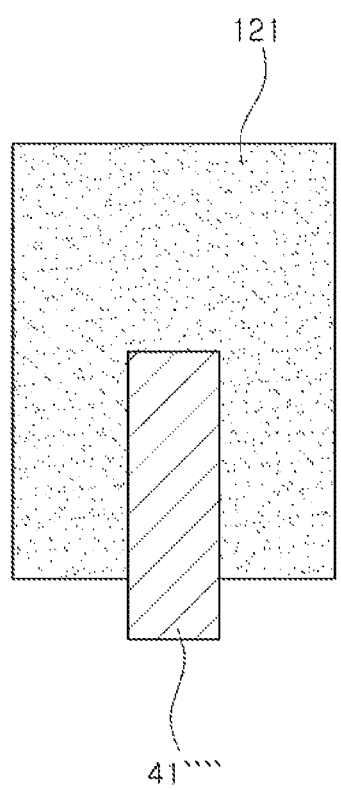
FIG. 4B is a side view viewed in a direction indicated by the arrow P of FIG. 4A.

FIG. 4B is a side view of the multilayer electronic component viewed taken in a direction indicated by the arrow P of FIG. 4A. Referring to FIG. 4B, the first common external electrode 121 may be disposed to surround a first lead terminal 41"". The first common external electrode 121 is electrically connected to both a first internal electrode within a first multilayer body and a first internal electrode within a second multilayer body, and soldered through the first lead terminal 41"" so as to be connected to a mounting board. Similarly, although not shown, the second common external electrode 122 may be disposed to surround a second lead terminal 42"". The second common external electrode 122 is electrically connected to both a second internal electrode within the first multilayer body and a second internal electrode within the second multilayer body, and soldered through the second lead terminal 42"" so as to be connected to the mounting board.

In FIG. 4A, a length of a fixing member 3"" may be adjusted to be modified to be shorter in an inward direction of first and second edges facing each other in a length direction of an upper surface of the first multilayer body, to extend to correspond to the first and second edges, or to extend to be longer in an outward direction of the first and second edges. It is to be note that the same, or similar, elements of FIGS. 1 and 2 are also indicated in FIG. 4A, but including a "" or a "" following each corresponding numeral in FIG. 4A.

Figure 5:
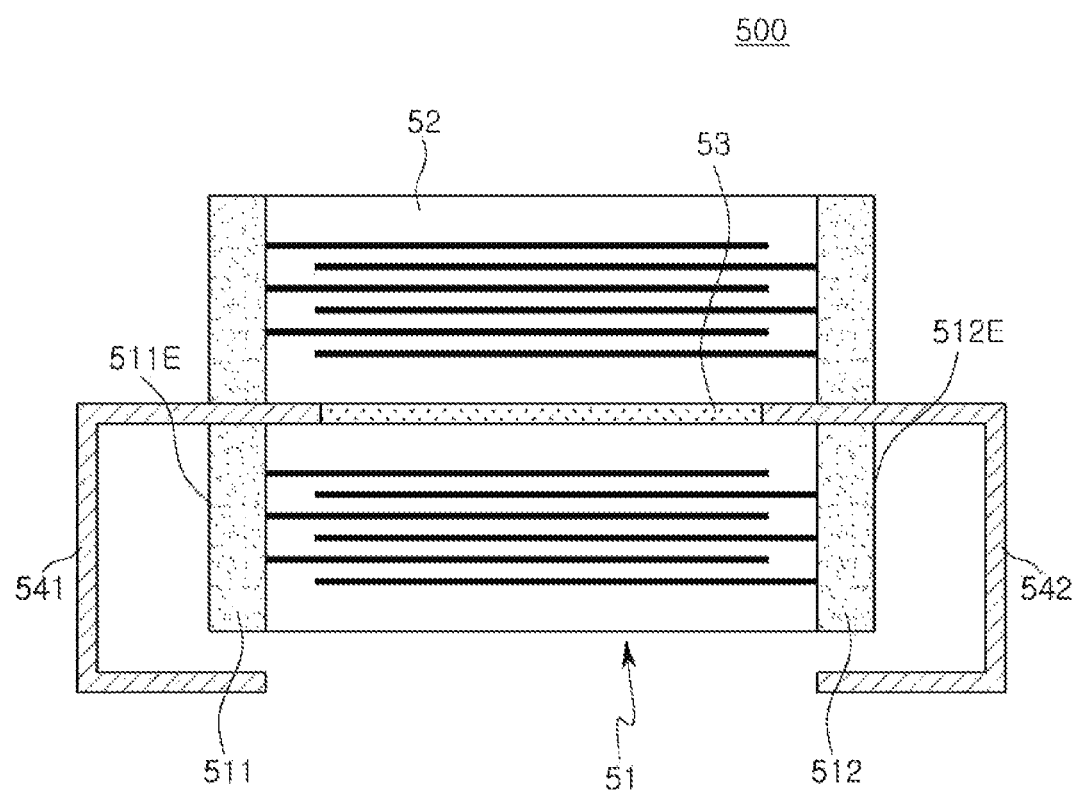
FIG. 5 is a cross-sectional view of a multilayer electronic component according to a modification of the multilayer electronic component of FIG. 1.

FIG. 5 is a cross-sectional view of a multilayer electronic component according to a modified example of the multilayer electronic component of FIG. 1. Compared with the multilayer electronic component of FIG. 1, in the multilayer electronic component of FIG. 5, first and second lead terminals are not disposed to be in contact with exposed surfaces of first and second external electrodes of a first capacitor in the length direction, and other components are the same. Thus, a detailed description of the multilayer electronic component of FIG. 5 of substantially the same components as those of the multilayer electronic component of FIG. 1 will be omitted.

Referring to FIG. 5, a first external electrode 511 and a second external electrode 512 are disposed at opposing end portions of a first capacitor 51 in a length direction. The first external electrode 511 includes a first side surface 511E exposed in the length direction, and the second external electrode 512 includes a second side surface 512E exposed in the length direction on the opposite side of the first side surface 511E.

In FIG. 5, first and second lead terminals 541 and 542 are connected to opposing end portions of a fixing member 53 connecting the first capacitor 51 and the second capacitor 52. Here, the first lead terminal 541 extends to be longer in the length direction, relative to the multilayer electronic component of FIG. 1, and is bent in a downward direction. Thus, the first side surface 511E of the first external electrode 511 and the first lead terminal 541 are spaced apart from each other at a predetermined interval, and the second lead terminal 542 extends to be longer in the length direction on the opposite side of the first side surface 511E, relative to the multilayer electronic component of FIG. 1, and is bent in a downward direction. Thus, the second side surface 512E of the second external electrode 512 and the second lead terminal 542 are spaced apart from each other at a predetermined interval. A degree to which the first side surface 511E and the first lead terminal 541 are spaced apart from each other, and a degree to which the second side surface 512E and the second lead terminal 542 are spaced apart from each other, may be appropriately selected by a person skilled in the art and may be determined in consideration of a capacitor size.

Although not shown, in the multilayer electronic components of FIGS. 2 through 4, the first and second lead terminals may extend to be longer in the length direction than in a width or height direction, to form a bent portion. In detail, in FIGS. 2 through 4, lengths of the first and second lead terminals may be modified such that the first side surface to which the first external electrode of the first capacitor is exposed in the length direction, and the second side surface to which the second external electrode of the first capacitor is exposed in the length direction, may be spaced apart from the first and second lead terminals by a predetermined interval, respectively, rather than being in contact therewith.

In the multilayer electronic component according to any one of FIGS. 1 through 5, acoustic noise may be reduced. A mechanism of reducing acoustic noise is disclosed in that two multilayer bodies having a structure in which a plurality of internal electrodes and dielectric layers are stacked are connected in parallel and fixed through a fixing member, and the fixing member is positioned at the center of vibrations of the multilayer bodies, to allow vibrations generated within each of the multilayer bodies to be canceled out completely or partially.

As set forth above, according to exemplary embodiments of the present disclosure, the multilayer electronic component with reduced acoustic noise may be provided.

While example embodiments have been shown and described above, it will be apparent to those skilled in the art that modifications and variations could be made without departing from the scope of the present disclosure, as defined by the appended claims.

What is claimed is:

1. A multilayer electronic component, comprising:
   a first capacitor including a first multilayer body having a structure in which a plurality of internal electrodes and a plurality of dielectric layers are alternately stacked;
   a second capacitor including a second multilayer body disposed adjacent the first multilayer body, the second multilayer body connected to the first multilayer body in parallel, and the second multilayer body having a structure in which a plurality of internal electrodes and a plurality of dielectric layers are alternately stacked;
   a fixing member disposed in a space between the first and second capacitors and fixing the first and second multilayer bodies, the fixing member being a printed circuit board (PCB) or a flexible printed circuit board (FPCB);
   a first lead terminal extending in the space between the first and second capacitors to contact a first end portion of the fixing member; and
   a second lead terminal extending in the space between the first and second capacitors to contact a second end portion of the fixing member,
   wherein the fixing member is directly connected to the first and second multilayer bodies.

2. The multilayer electronic component of claim 1, wherein the first and second capacitors have the same thickness and capacitance.

3. The multilayer electronic component of claim 1, wherein the first and second multilayer bodies each include an active layer in which internal electrodes are alternately stacked, an upper cover layer disposed above the active layer, and a lower cover layer disposed below the active layer, the upper cover layer of the first multilayer body having the same thickness as that of the lower cover layer of the first multilayer body, and the upper cover layer of the second multilayer body having the same thickness as that of the lower cover layer of the second multilayer body.

4. The multilayer electronic component of claim 1, wherein:
   the first lead terminal includes a first end portion connected to the first end portion of the fixing member and a second end portion extending from the first end portion of the first lead terminal,
   a height from the first end portion to the second end portion of the first lead terminal is greater than a distance from an upper surface of the first multilayer body to a lower surface of the first multilayer body,
   the second lead terminal includes a first end portion connected to the second end portion of the fixing member and a second end portion extending from the first end portion of the second lead terminal, and
   a height from the first end portion to the second end portion of the second lead terminal is greater than a distance from an upper surface of the second multilayer body to a lower surface of the second multilayer body.

5. The multilayer electronic component of claim 4, wherein the first and second lead terminals each include at least one bent portion, and the second end portion of the first lead terminal and the second end portion of the second lead terminal face each other.

6. The multilayer electronic component of claim 1, wherein the first end portion and the second end portion of the fixing member are disposed on a first edge of an upper surface of the first multilayer body and a second edge of the first multilayer body facing the first edge.

7. The multilayer electronic component of claim 1, wherein the first end portion of the fixing member extends to an outer side of a first edge of an upper surface of the first multilayer body, and the second end portion of the fixing member extends to an outer side of a second edge of the upper surface of the first multilayer body facing the first edge.

8. The multilayer electronic component of claim 1, wherein the first end portion of the fixing member is disposed on an inner side of a first edge of an upper surface of the first multilayer body, and the second end portion of the fixing member is disposed on an inner side of a second edge of the upper surface of the first multilayer body facing the first edge.

9. The multilayer electronic component of claim 1, wherein:
   the first capacitor further includes first and second external electrodes disposed on first and second surfaces, respectively, among external surfaces of the first multilayer body, facing each other in a length direction, and
   the second capacitor further includes third and fourth external electrodes disposed on third and fourth surfaces, respectively, among external surfaces of the second multilayer body, facing each other in a length direction.

10. The multilayer electronic component of claim 9, wherein the first lead terminal is disposed on at least a portion of a region of the external surface of the first external electrode, and the second lead terminal is disposed on at least a portion of a region of the external surface of the second external electrode.

11. The multilayer electronic component of claim 1, further comprising a first common external electrode surrounding an area extending from a lower surface of the first multilayer body of the first capacitor to an upper surface of the second multilayer body of the second capacitor, and a second common external electrode facing the first common external electrode in a length direction of the first and second multilayer bodies.

12. The multilayer electronic component of claim 11, wherein the first lead terminal is disposed on at least a portion of a region of an external surface of the first common external electrode, the second lead terminal is disposed on at least a portion of a region of an external surface of the second common external electrode, and the first and second lead terminals are disposed below a lower surface of the second multilayer body.

13. The multilayer electronic component of claim 1, wherein the first and second lead terminals are metal frames.

14. The multilayer electronic component of claim 1, wherein the first and second lead terminals each includes a portion connected to the first and second end portions of the fixing member, respectively, and
the portion of the first and second lead terminals is connected to an upper surface of the first multilayer body and a lower surface of the second multilayer body.

15. The multilayer electronic component of claim 1, wherein the fixing member is positioned at a center of the first and second multilayer bodies.

16. The multilayer electronic component of claim 1, wherein the first capacitor includes first and second external electrodes, the second capacitor includes first and second external electrodes, the first lead terminal contacts the first external electrodes of the first and second capacitors in the space between the first and second capacitors, and the second lead terminal contacts the second external electrodes of the first and second capacitors in the space between the first and second capacitors.

17. The multilayer electronic component of claim 1, wherein a first end of the first lead terminal is disposed in the space between the first and second capacitors, and a first end of the second lead terminal is disposed in the space between the first and second capacitors,
the first end of the first lead terminal contacts the first end portion of the fixing member in the space between the first and second capacitors, and
the first end of the second lead terminal contacts the second end portion of the fixing member in the space between the first and second capacitors.

18. The multilayer electronic component of claim 1, wherein the second capacitor is disposed above the first capacitor,
the fixing member is disposed in a space between an upper surface of the first capacitor and a lower surface of the second capacitor, and
the first and second lead terminals each extend along respective portions of the upper surface of the first capacitor and respective ends surfaces of opposing end surfaces of the first capacitor adjacent to the upper surface of the first capacitor.

19. The multilayer electronic component of claim 18, wherein opposing ends surfaces and opposing side surfaces of the second capacitor are each adjacent to the lower surface of the second capacitor and are each free of the first and second lead terminals.

20. The multilayer electronic component of claim 18, wherein the first capacitor includes first and second external electrodes disposed on respective portions of the upper surface of the first capacitor,
the second capacitor includes first and second external electrodes disposed on respective portions of the lower surface of the first capacitor,
the first lead terminal contacts the first external electrodes of the first and second capacitors along the upper surface of the first capacitor and the lower surface of the second capacitor, respectively, and
the second lead terminal contacts the second external electrodes of the first and second capacitors along the upper surface of the first capacitor and the lower surface of the second capacitor.

* * * * *